(12) United States Patent
Kawai et al.

(10) Patent No.: US 8,320,106 B2
(45) Date of Patent: Nov. 27, 2012

(54) LOWER-FACE ELECTRODE TYPE SOLID ELECTROLYTIC MULTILAYER CAPACITOR AND MOUNTING MEMBER HAVING THE SAME

(75) Inventors: Akihiro Kawai, Sendai (JP); Kenji Araki, Sendai (JP)

(73) Assignee: NEC Tokin Corporation, Sendai-Shi (JP)

( * ) Notice: Subject to any disclaimer, the term of this patent is extended or adjusted under 35 U.S.C. 154(b) by 237 days.

(21) Appl. No.: 12/950,312

(22) Filed: Nov. 19, 2010

(65) Prior Publication Data
US 2011/0292626 A1 Dec. 1, 2011

(30) Foreign Application Priority Data
Jun. 1, 2010 (JP) ................................ 2010-125431

(51) Int. Cl.
*H01G 4/228* (2006.01)
*H01G 9/00* (2006.01)
(52) U.S. Cl. ........................................ 361/540; 361/528
(58) Field of Classification Search .................. 361/528, 361/540
See application file for complete search history.

(56) References Cited

U.S. PATENT DOCUMENTS

| 4,561,041 A * | 12/1985 | Crowley et al. | 361/540 |
|---|---|---|---|
| 4,933,812 A * | 6/1990 | Becker | 361/540 |
| 6,625,009 B2 * | 9/2003 | Maeda | 361/528 |
| 6,808,541 B2 * | 10/2004 | Maeda | 29/25.03 |
| 6,816,358 B2 * | 11/2004 | Kida et al. | 361/540 |
| 6,891,717 B2 * | 5/2005 | Fujii et al. | 361/523 |
| 6,903,921 B2 * | 6/2005 | Ishijima | 361/523 |
| 7,158,368 B2 * | 1/2007 | Fujii et al. | 361/540 |
| 7,262,955 B2 * | 8/2007 | Ishida et al. | 361/540 |
| 7,337,513 B2 * | 3/2008 | Sano et al. | 29/25.42 |
| 7,352,562 B2 * | 4/2008 | Tanaka | 361/540 |
| 7,542,267 B2 * | 6/2009 | Ishijima | 361/523 |
| 7,835,138 B2 * | 11/2010 | Yamashita et al. | 361/523 |
| 7,869,190 B2 * | 1/2011 | Matsuoka et al. | 361/540 |
| 8,075,640 B2 * | 12/2011 | Marek et al. | 29/25.03 |
| 2009/0237866 A1 * | 9/2009 | Okada et al. | 361/528 |

FOREIGN PATENT DOCUMENTS

| JP | 02105511 A * | 4/1990 |
|---|---|---|
| JP | A-2004-103981 | 4/2004 |
| JP | A-2008-258602 | 10/2008 |

* cited by examiner

*Primary Examiner* — Eric Thomas
(74) *Attorney, Agent, or Firm* — Oliff & Berridge, PLC

(57) ABSTRACT

In a lower-face electrode type solid electrolytic multilayer capacitor and a mounting member having the same according to the present invention, fillet forming portions are formed by forming an electrode substrate cutting portion at a predetermined portion of an edge face in longer direction or in shorter direction of an electrode substrate, and a covering resin cutting portion on an edge face of a covering resin in a staircase pattern so that the electrode substrate cutting portion is surrounded by the covering resin cutting portion. According to the present invention, it is possible to provide the lower-face electrode type solid electrolytic multilayer capacitor and the mounting member having the same, in which the productivity is excellent, the volume efficiency can be improved to achieve the high capacitance, and the stable fillet can be formed on mounting.

3 Claims, 4 Drawing Sheets

PRIOR ART

LOWER-FACE ELECTRODE TYPE SOLID ELECTROLYTIC MULTILAYER CAPACITOR AND MOUNTING MEMBER HAVING THE SAME

INCORPORATION BY REFERENCE

This application is based upon and claims the benefit of priority from Japanese patent application No. 2010-125431, filed on Jun. 1, 2010, the disclosure of which is incorporated herein in its entirety by reference.

BACKGROUND OF THE INVENTION

1. Field of the Invention

The present invention relates to a lower-face electrode type solid electrolytic multilayer capacitor and a mounting member having the same for a power circuit or the like.

2. Description of the Related Art

A solid electrolytic capacitor using a valve action metal such as tantalum, niobium, or the like has small element size, high capacitance, and excellent frequency property. For this reason, the solid electrolytic capacitor has been widely used for a decoupling circuit of a CPU, a power circuit, or the like. Further, as a mobile electronic equipment has been developed, commercialization of a lower-face electrode type solid electrolytic multilayer capacitor has been especially promoted. When the lower-face electrode type solid electrolytic multilayer capacitor of this type is mounted on an electronic circuit substrate, not only a terminal portion of an electrode plane of the solid electrolytic multilayer capacitor but also an interface (fillet) where the terminal portion and the mounting substrate are soldered become important.

Japanese Unexamined Patent Application Publication No. 2004-103981 discloses a technique for a solid electrolytic capacitor. In the solid electrolytic capacitor according to Japanese Unexamined Patent Application Publication No. 2004-103981, recesses are formed on side surfaces of an anode terminal and a cathode terminal. These recesses are opened on the mounting side surface, or the opposite side of the mounting side surface in addition to the mounting side surface. Further, when the solid electrolytic capacitor is mounted on the mounting substrate with the solder, the solder is joined to a bottom face of the recess from the mounting side surface to the bottom face.

FIG. 4 (FIG. 8 in Japanese Unexamined Patent Application Publication No. 2008-258602) shows a plane view of a lower-face electrode type solid electrolytic capacitor disclosed in Japanese Unexamined Patent Application Publication No. 2008-258602. FIG. 4 shows the plane view of the lower-face electrode type solid electrolytic capacitor having fillet forming faces 200 formed in an electrode substrate 201.

In the technique disclosed in Japanese Unexamined Patent Application Publication No. 2008-258602, notches are formed on outside faces exposed to the outside at the portion where an anode portion and a cathode portion of the solid electrolytic capacitor are electrically connected to an external element. Further, the solid electrolytic capacitor is connected to the capacitor element by using a converting substrate having an anode terminal forming portion and a cathode terminal forming portion in which plating is performed. After a covering resin 202 (reference symbol 19 in Japanese Unexamined Patent Application Publication No. 2008-258602) is formed thereon, the covering resin and the converting substrate are cut along cutting planes to form the fillet forming faces 200 (reference symbols 15e, 15f in Japanese Unexamined Patent Application Publication No. 2008-258602) on the outside faces of the anode portion and cathode portion of the solid electrolytic capacitor.

SUMMARY OF THE INVENTION

In the lower-face electrode type solid electrolytic multilayer capacitor in which its miniaturization is required, to achieve further miniaturization, the improvement of volume efficiency of the capacitor element with respect to the outer dimensions of the lower-face electrode type solid electrolytic multilayer capacitor is indispensable.

However, as mentioned above, there are problems in the structure having the recesses at the lead frame (Japanese Unexamined Patent Application Publication No. 2004-103981) or the structure having the fillet forming faces on the electrode substrate (Japanese Unexamined Patent Application Publication No. 2008-258602). Therefore, it is difficult to form the stable fillet with solving these problems.

In the structure disclosed in Japanese Unexamined Patent Application Publication No. 2004-103981, the manufacturing frame (lead frame) having partially L-shaped portion causes decrease of the volume efficiency. Further, the covering resin may flow into a surface of a lead frame mounting terminal. This causes failure in mounting on a circuit substrate.

Additionally, in the structure disclosed in Japanese Unexamined Patent Application Publication No. 2004-103981, in which the fillet is formed at the portion where the plating is performed at the surface (cavity) that is exposed to the outside face of the anode electrode and the cathode electrode of the capacitor, there is a problem that the height for forming the fillet is insufficient because of the restriction by the thickness of the lead frame.

In the structure disclosed in Japanese Unexamined Patent Application Publication No. 2008-258602, the solder wets up at the fillet forming face 200. However, the electrode substrate extends to an outer side of the covering resin and the size of the covering resin is restricted. Therefore, the area of the cathode electrode becomes small and this structure causes the disadvantage for achieving high capacitance.

In view of the above problems, it is an object of the present invention to provide a lower-face electrode type solid electrolytic multilayer capacitor and a mounting member having the same, in which the problems mentioned above are solved, the productivity is excellent, the volume efficiency can be improved to achieve the high capacitance, and the stable fillet can be formed on mounting.

To solve the above problems, the lower-face electrode type solid electrolytic multilayer capacitor according to the present invention includes an electrode substrate cutting portion formed at an edge face of the electrode substrate and a covering resin cutting portion formed on an edge face of the covering resin in a staircase pattern so that the electrode substrate cutting portion is surrounded by the covering resin cutting portion.

This makes it possible to provide the lower-face electrode type solid electrolytic multilayer capacitor and the mounting member having the same, in which the stable fillet can be formed on mounting.

A first exemplary aspect of the present invention is a lower-face electrode type solid electrolytic multilayer capacitor including: a solid electrolytic multilayer capacitor element having layered capacitor elements, each of the capacitor elements having an anode portion and a cathode portion, the anode portion being one side of an anode body having a valve action metal that is linear shape, foil shape, or plate shape, and the cathode portion having a dielectric layer, a solid electrolyte layer, a graphite layer, and a silver paste layer formed in series on a surface of the other side of the anode body separated by an insulating resin layer; and an electrode substrate having an element connecting electrode terminal on one side of the electrode substrate and a mounting electrode side terminal on the other side of the electrode substrate, the element connecting electrode terminal being electrically connected to the anode portion or the cathode portion of the solid electrolytic multilayer capacitor element, the mounting electrode side terminal being electrically connected to a circuit board, and the element connecting electrode terminal and the mounting electrode side terminal being electrically connected each other; in which the solid electrolytic multilayer capacitor is packaged by a covering resin such that the mounting electrode side terminal of the electrode substrate is exposed, an electrode substrate cutting portion is formed at an edge face of the electrode substrate on which the element connecting electrode terminal and the mounting electrode side terminal are arranged, a side surface of the electrode substrate cutting portion is plated so that the element connecting electrode terminal is electrically connected to the mounting electrode side terminal, and a covering resin cutting portion is formed on an edge face of the covering resin in a staircase pattern so that the electrode substrate cutting portion is surrounded by the covering resin cutting portion.

A second exemplary aspect of the present invention is a mounting member having the solid electrolytic multilayer capacitor, in which the solid electrolytic multilayer capacitor is mounted on the circuit board by solder.

A third exemplary aspect of the present invention is the mounting member having the solid electrolytic multilayer capacitor, in which at least a part of the side surface of the electrode substrate cutting portion, the side surface being plated, and the element connecting electrode terminal of the electrode substrate is covered by a fillet formed by the solder.

In the present invention, the electrode substrate cutting portion is formed at the predetermined portion of the edge face in longer direction or in shorter direction of the electrode substrate. Further, the covering resin cutting portion is formed on the edge face of the covering resin in a staircase pattern so that the electrode substrate cutting portion (hereinafter fillet forming portion, anode fillet forming portion, or cathode fillet forming portion) is surrounded by the covering resin cutting portion.

This structure makes it possible to stably form the fillet that is formed when the mounting electrode side anode terminal and the mounting electrode side cathode terminal are soldered to the circuit board.

Further, this makes it possible to provide the lower-face electrode type solid electrolytic multilayer capacitor and the mounting member having the same, in which the volume efficiency is improved.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

The above and other exemplary aspects, advantages and features will be more apparent from the following description of certain exemplary embodiments taken in conjunction with the accompanying drawings, in which.

DESCRIPTION OF THE EXEMPLARY EMBODIMENTS

An exemplary embodiment of the present invention will be described below with reference to the accompanying drawings.

Figure 1A:
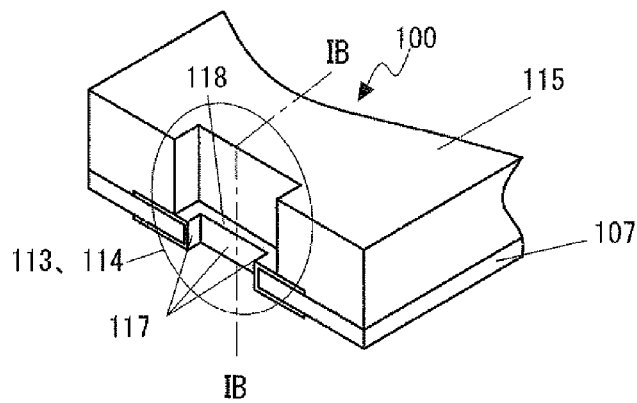
FIG. 1A is a diagram showing a lower-face electrode type solid electrolytic multilayer capacitor according to an exemplary embodiment of the present invention and a perspective view showing an anode fillet forming portion or a cathode fillet forming portion of the capacitor.
Figure 1B:
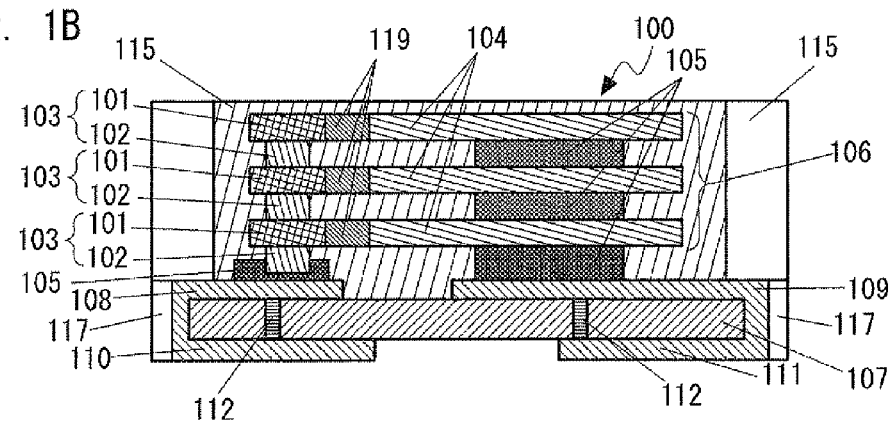
FIG. 1B is a diagram showing a lower-face electrode type solid electrolytic multilayer capacitor according to an exemplary embodiment of the present invention and a cross-section view showing the capacitor taken along the line IB-IB in FIG. 1A.
Figure 1C:
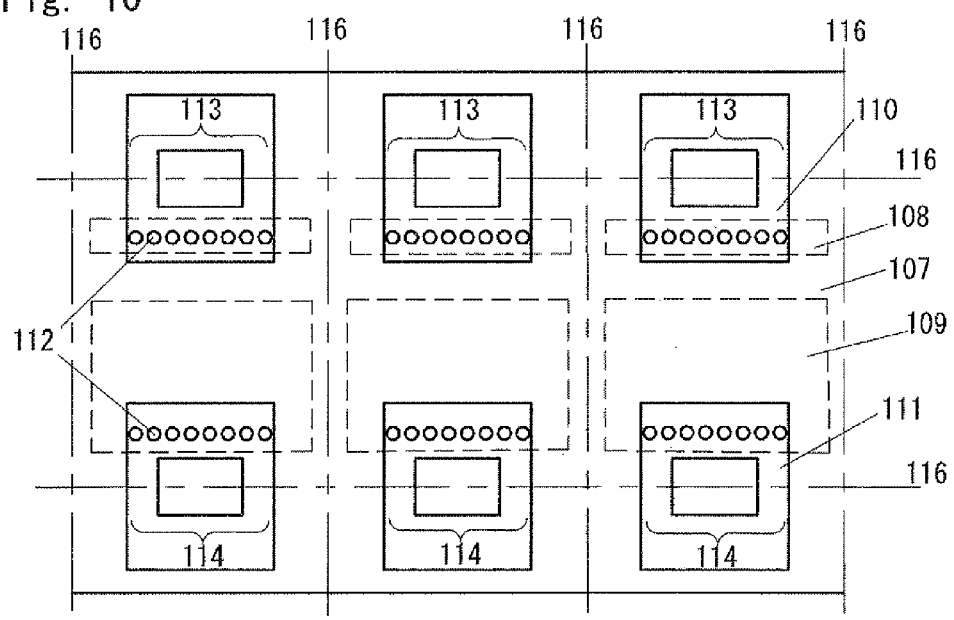
FIG. 1C is a diagram showing a lower-face electrode type solid electrolytic multilayer capacitor according to an exemplary embodiment of the present invention and a plan view showing an electrode substrate when viewed from a mounting electrode side before cutting.

FIGS. 1A, 1B, and 1C are diagrams showing a lower-face electrode type solid electrolytic multilayer capacitor according to this exemplary embodiment of the present invention. FIG. 1A is a perspective view showing an anode fillet forming portion or a cathode fillet forming portion of the capacitor. FIG. 1B is a cross-section view showing the capacitor taken along the line IB-IB in FIG. 1A. FIG. 1C is a plan view showing an electrode substrate when viewed from a mounting electrode side before cutting.

After a surface area of an anode body including a plate-like or foil-like valve metal is widened, a dielectric film is electrochemically formed on the surface. An insulating resin 119 is applied in the portion where a part of the dielectric film is removed to insulate an anode portion side from a cathode portion side of the capacitor element. After that, a conductive polymer layer is formed on the surface of the anode body as a solid electrolytic layer. Further, a graphite layer and a silver paste layer are formed on the surface of the solid electrolytic layer as a cathode layer. Thus, a cathode portion 104 of the capacitor element is formed.

An anode portion 101 of the capacitor element is configured by the portion in which the anode body is exposed by removing the dielectric film. A capacitor element body 103 is configured by joining a metal piece 102 and the portion where the anode body is exposed by removing the dielectric film of the anode portion 101 of the capacitor element. Electrical welding, laser welding, or the like is used for joining.

After that, the capacitor element bodies 103 are layered by applying an electrically-conducting adhesive 105 to the cathode portions 104 of the capacitor elements. Then, a capacitor element multilayered body 106 is obtained by joining the anode portions 101 of the capacitor elements each other.

Next, the anode portion 101 and the cathode portion 104 of the capacitor element are connected to an element connecting anode terminal 108 and an element connecting cathode terminal 109 of the electrode substrate 107 through the electrically-conducting adhesive 105, respectively.

Note that, the element connecting anode terminal 108, the element connecting cathode terminal 109, a mounting electrode side anode terminal 110, and a mounting electrode side cathode terminal 111 which include copper foil, copper plating, or the like, are formed on the electrode substrate 107. Further, the element connecting anode terminal 108 and the mounting electrode side anode terminal 110 are electrically connected by via 112 plated with copper. Similarly, the element connecting cathode terminal 109 and the mounting electrode side cathode terminal 111 are electrically connected by via 112.

Next, a through-hole 113a and a through-hole 114a that configure the fillet forming portion are explained with reference to FIGS. 3A, 3B and 1C.

Figure 3A:
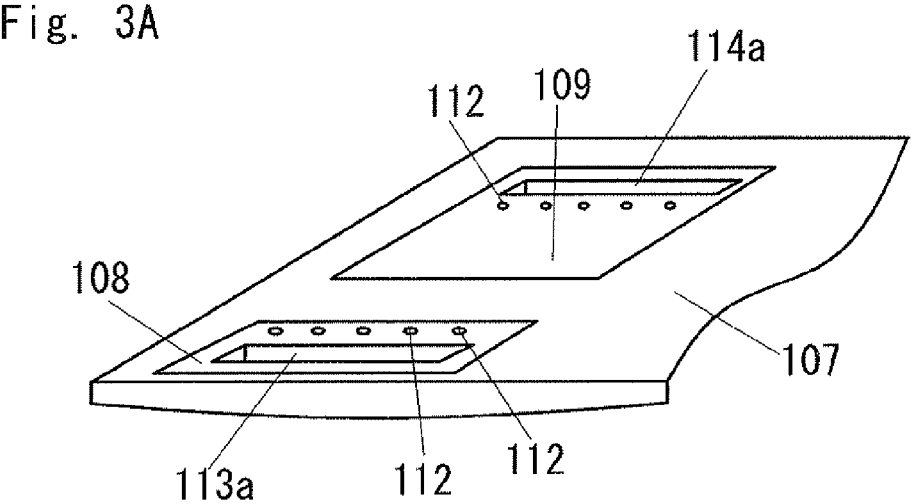
FIG. 3A is a perspective view of the electrode substrate when viewed from a capacitor element mounting face side.
Figure 3B:
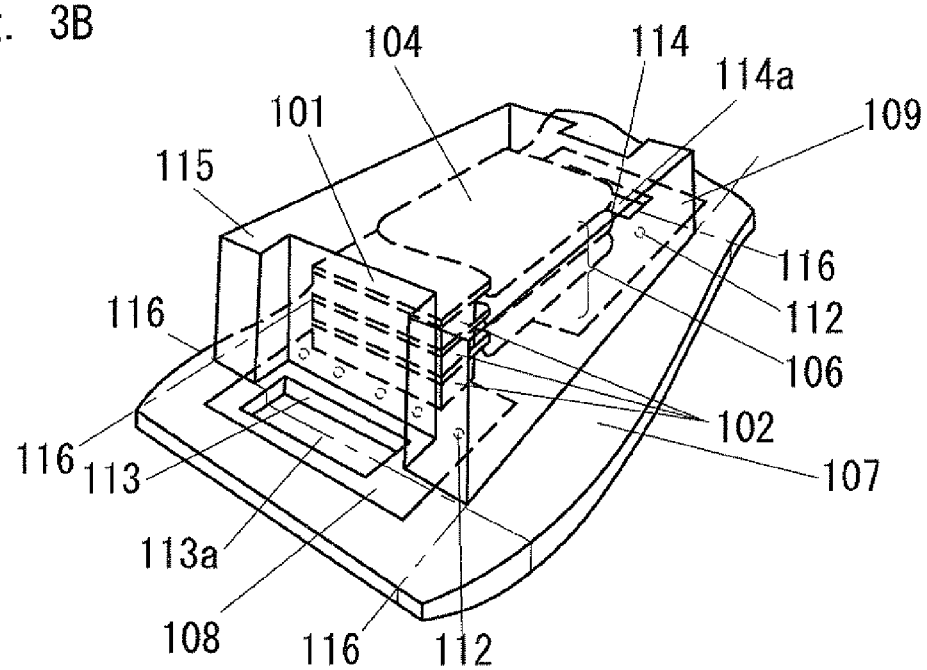
FIG. 3B is a perspective view of the electrode substrate and the electrode substrate having capacitor mounted thereon when the capacitor is mounted and covered.
Figure 4:
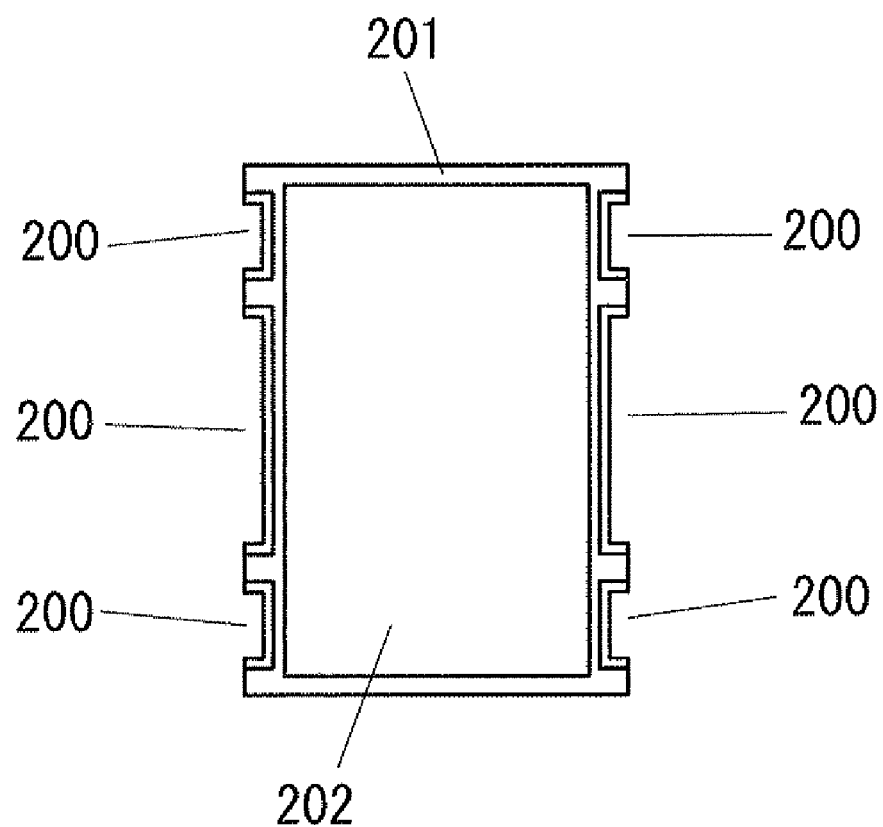
FIG. 4 is a plan view showing a lower-face electrode type solid electrolytic capacitor disclosed in Japanese Unexamined Patent Application Publication No. 2008-258602.

FIGS. 3A and 3B are diagrams showing the electrode substrate and the electrode substrate having the capacitor mounted thereon. FIG. 3A is a perspective view when viewed from a capacitor element mounting face side. FIG. 3B is a perspective view when the capacitor is mounted and covered.

The through-hole 113a and the through-hole 114a are formed when the electrode substrate 107 is formed. Lengths and widths of the through-holes 113a and 114a are decided as desired depending on shape and value of capacitance of the capacitor. Further, the through-hole 113a and the through-hole 114a are plated with copper as is the case in via 112.

Note that, shapes of the through-hole 113a and the through-hole 114a are not specifically limited. Cutting portions with U-shape, V-shape, or the like are available when used as the fillet forming portion. Any shape is available as long as the fillet is formed easily with solder.

Then, mold forming or the like is performed by covering resin 115 including epoxy resin or the like. After the capacitor is covered by resin, the electrode substrate 107 is cut along cutting line 116. Thus, anode fillet forming portions 113 and cathode fillet forming portions 114 are formed. On the surfaces of the anode fillet forming portions 113 and the cathode fillet forming portions 114, copper foil or copper plating is formed.

Note that, the plating formed on the electrode substrate 107, the through-hole 113a, and the through-hole 114a may include at least one of nickel, palladium, gold, and the like, in addition to copper.

Figure 2A:
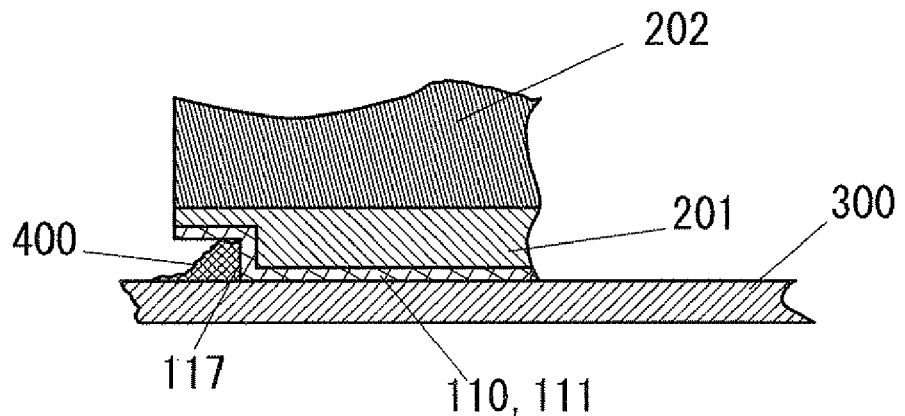
FIG. 2A is a cross-section view showing the solder wet up at the fillet forming portion according to the prior art.
Figure 2B:
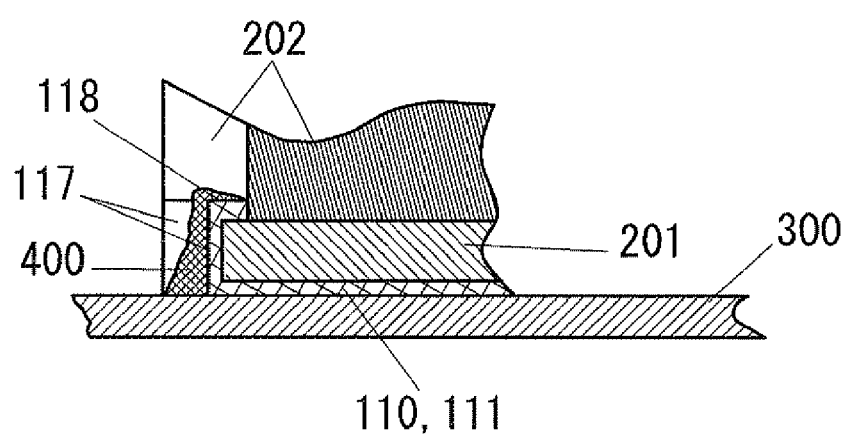
FIG. 2B is a cross-section view showing the solder wet up at the fillet forming portion according to the present invention.

Here, the anode fillet forming portions 113 and the cathode fillet forming portions 114 are explained with reference to FIGS. 1A, 2A, and 2B. FIG. 2A is a cross-section view showing the solder wet up at the fillet forming portion according to the prior art. FIG. 2B is a cross-section view showing the solder wet up at the fillet forming portion according to the present invention.

As shown in FIG. 1A, the fillet forming portion is configured by forming an electrode substrate cutting portion on an edge face in shorter direction of the anode portion and the cathode portion of the electrode substrate of the lower-face electrode type solid electrolytic multilayer capacitor 100.

Further, the covering resin cutting portion is formed on an edge face of the covering resin 115 in a staircase pattern so that the electrode substrate cutting portion is surrounded by the covering resin cutting portion. The side surface of the electrode substrate cutting portion becomes a plated side surface portion 117 on which the plate is formed. A part of the surface of the element connecting electrode terminal on the electrode terminal obtained by forming the covering resin cutting portion becomes a plated upper surface portion 118.

The fillet forming portion according to the prior art shown in FIG. 2A has the structure in which the fillet forming portion does not penetrate. Therefore, a solder 400 only wets on the plated side surface portion 117. On the other hand, in the fillet forming portion according to the present invention shown in FIG. 2B, the solder wets up not only on the plated side surface portion 117 but also on the plated upper surface portion 118. Therefore, compared with the fillet forming portion according to the prior art, the area on which the solder wets increases, stable fillet can be formed, and it is easy to visually check the fillet forming portion after mounting.

Note that, the preferred thickness of the electrode substrate is in a range of 50 μm to 200 μm to improve the volume efficiency of the capacitor element body of the lower-face electrode type solid electrolytic multilayer capacitor.

Further, the fillet forming portion may be configured by forming the electrode substrate cutting portion on an edge face in longer direction of the anode portion and the cathode portion of the electrode substrate of the lower-face electrode type solid electrolytic multilayer capacitor. In this configuration, the same advantageous effects can be achieved.

EXAMPLE

An example of the present invention will be described below with reference to FIGS. 1A, 1B, and 1C.

Using an aluminum foil a surface area of which was widened by etching with 6.0 mm length, 3.5 mm width, and 350 μm thickness, an aluminum chemical foil was formed by electrochemically forming a dielectric film on the surface. After the etched portion of the aluminum chemical foil was removed, an insulating resin 119 was applied to insulate an anode portion from a cathode portion.

Further, a conductive polymer layer including polythiophene was formed on the surface of the aluminum chemical foil as the solid electrolyte layer, using chemical oxidative polymerization with ferric benzenesulfonate as oxidant and 3, 4-ethylenedioxythiophene as monomer. Further, a graphite layer and a silver paste layer were formed on the surface of the conductive polymer layer. Thus, a cathode portion 104 was formed.

After that, a metal piece 102 was joined to an anode portion 101 of a capacitor element with ultrasonic weld. This configured a capacitor element body 103. Note that, the metal piece 102 had the copper plate with 60 μm thickness and on which the silver plate was formed. An electrically-conducting adhesive 105 was applied to the cathode portions 104 of the capacitor elements of the capacitor element bodies 103 and three pieces of the capacitor element bodies 103 were multi-layered. Then, the cathode portions 104 of the capacitor elements were electrically connected each other by drying at 150° C. for 60 minutes.

Further, the aluminum substrates configuring the anode portions 101 and the metal pieces 102 were joined with laser welding to join the anode portions 101 of the capacitor elements each other. Thus, a capacitor element multilayered body 106 with three layers was formed.

Next, the structure in which the capacitor element multilayered body 106 with three layers is mounted on an electrode substrate 107 is explained with reference to FIGS. 3A and 3B.

The electrode substrate 107 with 100 μm thickness including glass epoxy was plated with copper with 20 μm thickness. Then, an element connecting anode terminal 108, an element connecting cathode terminal 109, a mounting electrode side anode terminal 110, and a mounting electrode side cathode terminal 111 were formed. At this point, a through-hole 113*a* and a through-hole 114*a* were plated with copper at the same time, and a plated side surface portion (reference symbol 117 in FIG. 1A) was formed. Further, a plurality of vias 112 were plated with copper in the same way. Thus, the element connecting anode terminal 108 and the mounting electrode side anode terminal 110 were electrically connected by via 112. Similarly, the element connecting cathode terminal 109 and the mounting electrode side cathode terminal 111 were electrically connected by via 112.

Next, the anode portion 101 and the cathode portion 104 of the manufactured capacitor element multilayered body 106 were connected to the element connecting anode terminal 108 and the element connecting cathode terminal 109 through the electrically-conducting adhesive including silver, respectively.

Then, an anode fillet forming portion 113 and a cathode fillet forming portion 114 were formed by covering the capacitor with covering resin 115 including epoxy resin and cutting the through-holes 113*a* and the through-holes 114*a* along cutting line 116. The through-holes 113*a* and the through-holes 114*a* were preliminarily plated with cooper.

Thus, the lower-face electrode type solid electrolytic multilayer capacitor and the mounting member having the same were achieved, in which stable fillet was formed, volume efficiency was improved, and it was easy to visually check the fillet forming portion after mounting.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A lower-face electrode type solid electrolytic multilayer capacitor comprising:

a solid electrolytic multilayer capacitor element having layered capacitor elements, each of the capacitor elements having an anode portion and a cathode portion, the anode portion being one side of an anode body having a valve action metal that is linear shape, foil shape, or plate shape, and the cathode portion having a dielectric layer, a solid electrolyte layer, a graphite layer, and a silver paste layer formed in series on a surface of the other side of the anode body separated by an insulating resin layer; and an electrode substrate having an element connecting electrode terminal on one side of the electrode substrate and a mounting electrode side terminal on the other side of the electrode substrate, the element connecting electrode terminal being electrically connected to the anode portion or the cathode portion of the solid electrolytic multilayer capacitor element, the mounting electrode side terminal being electrically connected to a circuit board, and the element connecting electrode terminal and the mounting electrode side terminal being electrically connected each other;

wherein the solid electrolytic multilayer capacitor is packaged by a covering resin such that the mounting electrode side terminal of the electrode substrate is exposed, an electrode substrate cutting portion is formed at an edge face of the electrode substrate on which the element connecting electrode terminal and the mounting electrode side terminal are arranged, a side surface of the electrode substrate cutting portion is plated so that the element connecting electrode terminal is electrically connected to the mounting electrode side terminal, and a covering resin cutting portion is formed on an edge face of the covering resin in a staircase pattern so that the electrode substrate cutting portion is surrounded by the covering resin cutting portion.

2. A mounting member having the solid electrolytic multilayer capacitor according to claim 1, wherein the solid electrolytic multilayer capacitor is mounted on the circuit board by solder.

3. The mounting member having the solid electrolytic multilayer capacitor according to claim 2, wherein at least a part of the side surface of the electrode substrate cutting portion, the side surface being plated, and the element connecting electrode terminal of the electrode substrate is covered by a fillet formed by the solder.

* * * * *